(12) United States Patent
Zhao

(10) Patent No.: US 10,800,304 B2
(45) Date of Patent: Oct. 13, 2020

(54) HEAD RESTRAINT LINKAGE FOR REVERSIBLE SEAT

(71) Applicant: Magna Seating Inc, Aurora (CM)

(72) Inventor: Kai Zhao, Rochester Hills, MI (US)

(73) Assignee: Magna Seating Inc., Aurora, Ontario (CA)

( * ) Notice: Subject to any disclaimer, the term of this patent is extended or adjusted under 35 U.S.C. 154(b) by 31 days.

(21) Appl. No.: 16/197,427

(22) Filed: Nov. 21, 2018

(65) Prior Publication Data
US 2019/0152369 A1    May 23, 2019

Related U.S. Application Data

(60) Provisional application No. 62/589,884, filed on Nov. 22, 2017.

(51) Int. Cl.
B60N 2/02      (2006.01)
B60N 2/856     (2018.01)
B60N 2/853     (2018.01)
B60N 2/22      (2006.01)

(52) U.S. Cl.
CPC .......... B60N 2/856 (2018.02); B60N 2/0252 (2013.01); B60N 2/0292 (2013.01); B60N 2/22 (2013.01); B60N 2/853 (2018.02)

(58) Field of Classification Search
CPC ...... B60N 2/3013; B60N 2/68; B60N 2/3068; B60N 2/838; B60N 2/3045; B60N 2/856; B60N 2/02; B60N 2/897; B60N 2/874; B60N 2002/952; B60N 2002/0204

USPC ......... 297/103, 61, 391, 408, 316, 326, 335, 297/334, 400, 403
See application file for complete search history.

(56) References Cited

U.S. PATENT DOCUMENTS

| | | | | |
|---|---|---|---|---|
| 5,700,054 A | * | 12/1997 | Lang .................... | B60N 2/3084 297/238 |
| 5,823,619 A | * | 10/1998 | Heilig ................... | B60N 2/829 297/216.12 |
| 5,927,804 A | * | 7/1999 | Cuevas ................. | B60N 2/888 297/216.12 |
| 6,074,011 A | * | 6/2000 | Ptak ...................... | B60N 2/874 297/408 |
| 7,185,950 B2 | * | 3/2007 | Pettersson ........... | B60N 2/42781 297/216.12 |
| 7,648,982 B2 | * | 1/2010 | Shafer .................. | A61K 9/0073 128/200.14 |
| 8,123,272 B2 | | 2/2012 | Ito et al. | |
| 8,297,678 B2 | * | 10/2012 | Nakao ................ | B60N 2/01583 296/65.09 |
| 8,845,026 B2 | * | 9/2014 | Kobayashi .......... | B60N 2/3013 297/324 |
| 8,864,209 B2 | * | 10/2014 | White ................... | B60N 2/065 296/65.01 |

(Continued)

Primary Examiner — Chi Q Nguyen
(74) Attorney, Agent, or Firm — Miller Canfield

(57) ABSTRACT

A reversible seat for an automotive vehicle having a head restraint which rotates to a fold flat position between a forward-facing position and a rearward-facing position as the seat is moved between opposing forward-facing and rearward-facing positions. The head restraint folds towards the seat back as the reversible seat passes through the peak of its locus to increase clearance with a headliner of the automotive vehicle. The head restraint returns to an upright inclined position as the seat reaches the opposing position.

20 Claims, 14 Drawing Sheets

(56) References Cited

U.S. PATENT DOCUMENTS

| | | | |
|---|---|---|---|
| 9,475,416 B2* | 10/2016 | DeForest | B60N 2/002 |
| 2005/0067874 A1* | 3/2005 | Kamrath | B60N 2/859 |
| | | | 297/408 |
| 2005/0179301 A1* | 8/2005 | Clark | B60N 2/874 |
| | | | 297/408 |
| 2005/0184549 A1 | 8/2005 | Robinson et al. | |
| 2006/0006720 A1* | 1/2006 | Yamada | B60N 2/22 |
| | | | 297/378.12 |
| 2006/0202534 A1* | 9/2006 | Heidmann | A47C 7/405 |
| | | | 297/354.1 |
| 2009/0058149 A1* | 3/2009 | Lindsay | B60N 2/0252 |
| | | | 297/61 |
| 2010/0007167 A1* | 1/2010 | Ito | B60N 2/22 |
| | | | 296/66 |
| 2010/0052370 A1* | 3/2010 | Fujisawa | B60N 2/01583 |
| | | | 297/15 |
| 2010/0156161 A1* | 6/2010 | LaPointe | A47C 7/38 |
| | | | 297/409 |
| 2011/0095592 A1* | 4/2011 | Willard | B60N 2/844 |
| | | | 297/408 |
| 2013/0175393 A1* | 7/2013 | Udriste | B64D 11/06 |
| | | | 244/122 R |
| 2016/0236595 A1 | 8/2016 | Tachikawa et al. | |

* cited by examiner

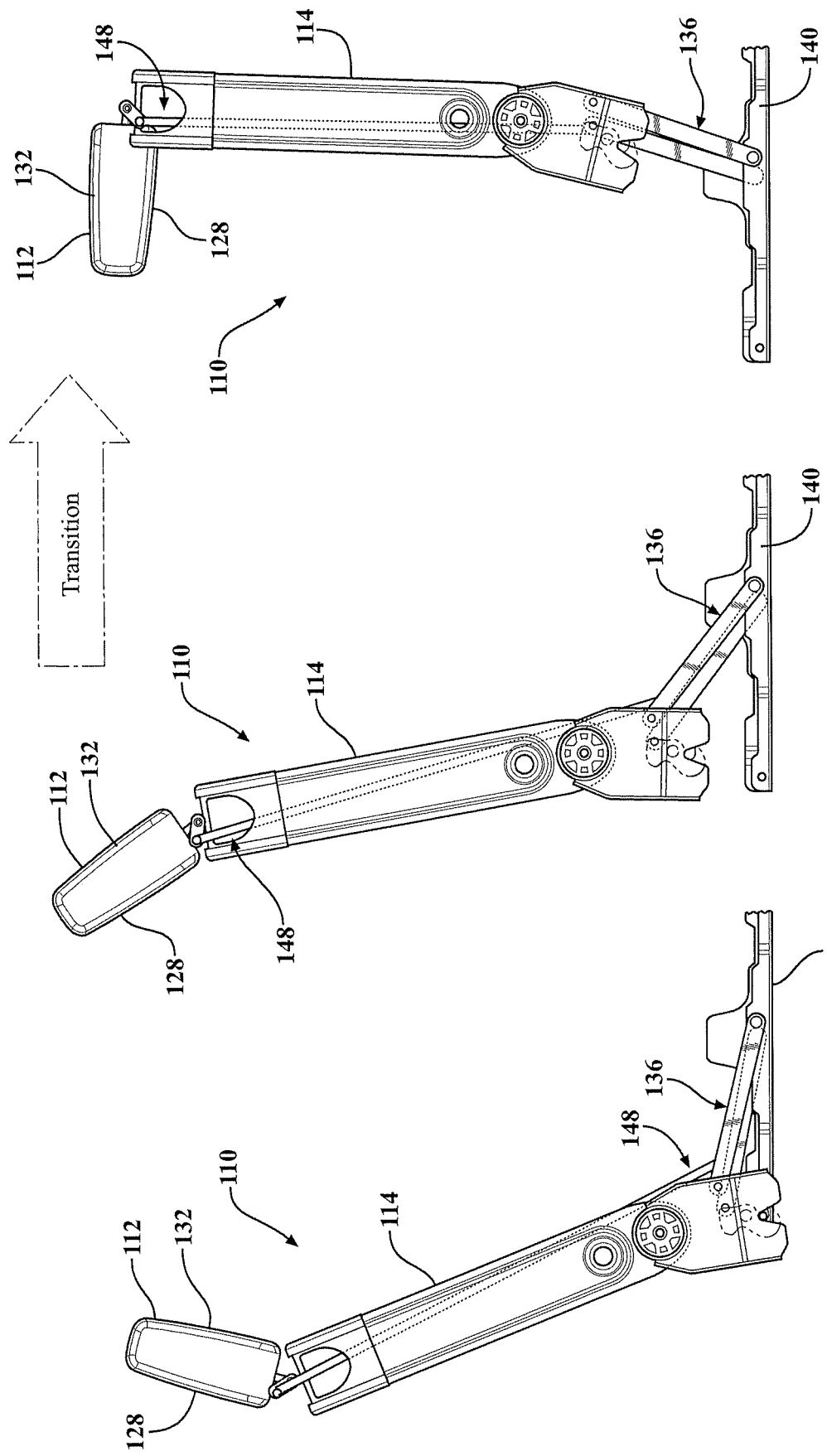

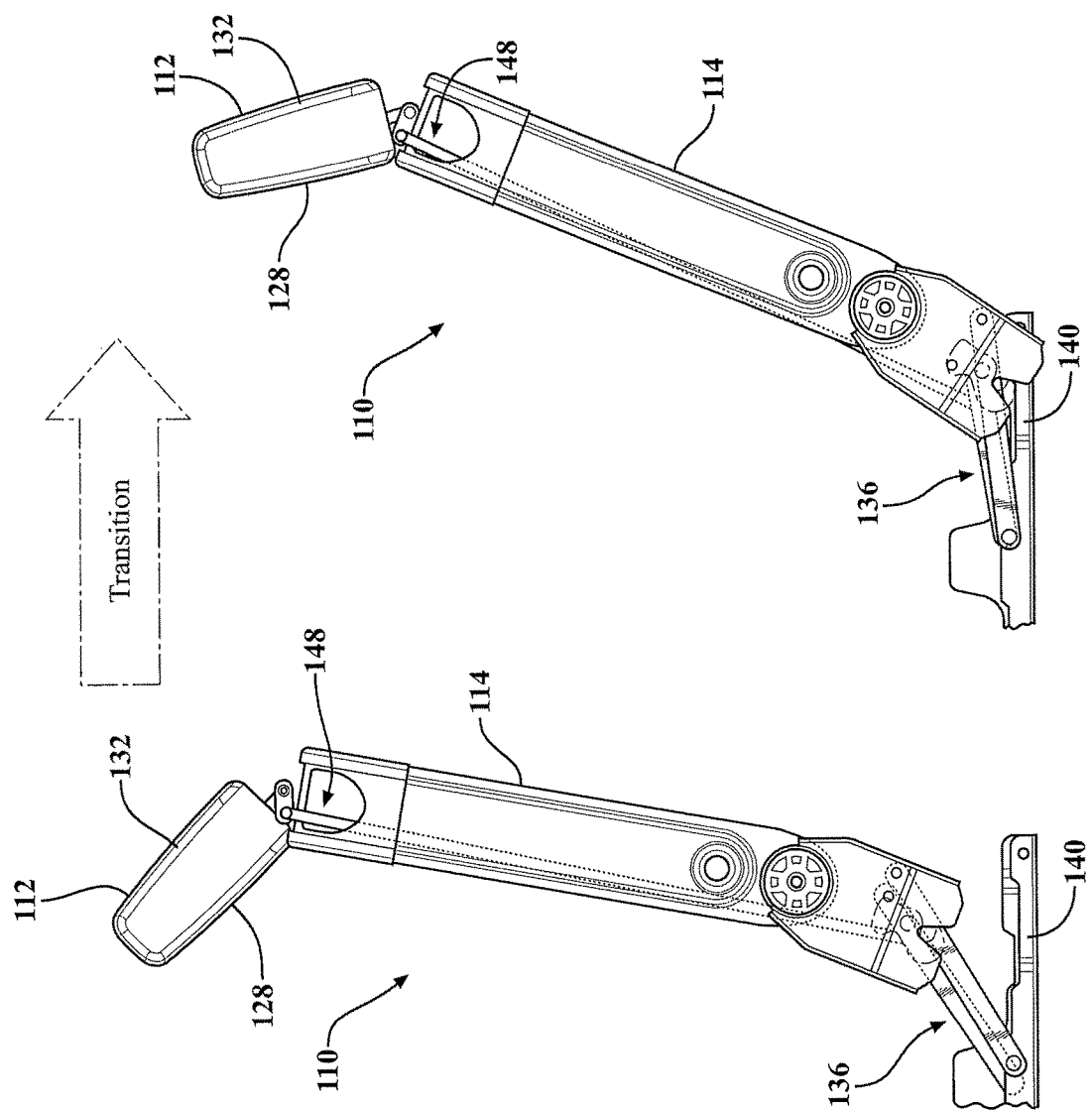
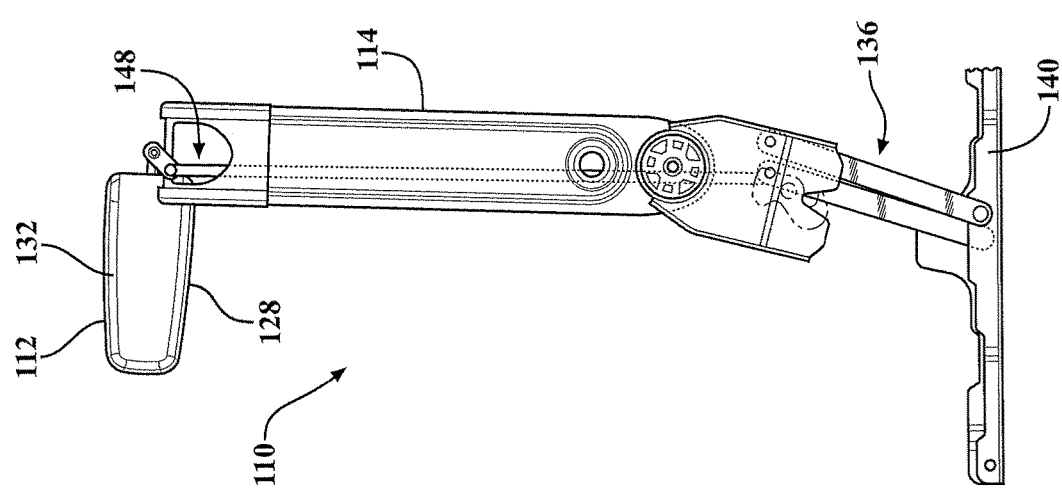
FIG. 2C-2  FIG. 2D  FIG. 2E

HEAD RESTRAINT LINKAGE FOR REVERSIBLE SEAT

CROSS-REFERENCE TO RELATED APPLICATIONS

This application claims priority to U.S. Provisional Application No. 62/589,884, filed on Nov. 22, 2017.

BACKGROUND OF THE INVENTION

1. Field of the Invention

The present invention relates to a head restraint for a reversible automotive seat, More particularly, the invention relates to a head restraint which folds flat and then returns to an upright position while the seat is moved between a forward-facing position and a rearward-facing position.

2. Description of Related Art

Various head restraint adjustment systems integrated into automotive seats are known in the art. One known system changes an inclination angle of a reversible head restraint as the reversible seat is moved between a forward-facing position and a rearward-facing position. However, during the reversible seat transition, a generally upright head restraint can interfere with a vehicle headliner.

Other known vehicle seats have head restraints which are folded down when a seat back is placed in a folded flat position. Some known head restraints may comprise mechanisms for adjusting the height and/or inclination of a head restraint on a vehicle seat back. Other known head restraints may be configured to be removable from the seat back prior to folding the seat back into a folded flat position. However, these generally known mechanisms to fold and/or change inclination angles of a head restraint are not operatively coupled with a seat reversing mechanism.

Current examples of reversible seats may result in the head restraint contacting a headliner in a vehicle when the reversible seat is moved between opposing positions. One alternative may be to reduce the overall height of a seat back and/or head restraint in order to provide clearance with the headliner during the seat reversing process. A reduced height may result in a seat which does not meet the Federal Motor Vehicle Safety Standards (FMVSS) 202A height requirements.

It is desirable, therefore, to improve the clearance with the headliner during the seat reversal process. It is also desirable to meet the FMVSS 202A height requirements when the seat is in both the forward-facing and rearward-facing positions. Further, it is desirable to have a head restraint which moves to the opposing position automatically based on the movement of the seat back between the two opposing positions. Finally, it is desirable to have a head restraint which is able to clear the headliner of the vehicle during a transition from one position to another by moving from a first design position (forward-facing) to a fold flat position and then to a second design position (rearward-facing).

SUMMARY OF THE INVENTION

A reversible seat for an automotive vehicle has a head restraint which folds towards a seat back and returns to an upright inclined position as the seat is moved between the forward-facing position and the rearward-facing position. The head restraint is able to clear the headliner of the vehicle during a transition from one position to another by moving from a first design position (forward-facing) to a fold flat position and then to a second design position (rearward-facing).

BRIEF DESCRIPTION OF THE DRAWINGS

Advantages of the present invention will be readily appreciated as the same becomes better understood by reference to the following detailed description when considered in connection with the accompanying drawings wherein:

FIG. 2A illustrates a side view of a reversible seat having a head restraint in a forward-facing position according to one embodiment of the present invention;

FIG. 2B illustrates a side view of the reversible seat of FIG. 2A in a forward-facing transition position according to one embodiment of the present invention;

FIGS. 2C-1 and 2C-2 illustrate side views of the reversible seat of FIG. 2A in a folded transition position according to one embodiment of the present invention;

FIG. 2D illustrates a side view of the reversible seat of FIG. 2A in a rearward-facing transition position according to one embodiment of the present invention;

FIG. 2E illustrates a side view of the reversible seat of FIG. 2A in a rearward-facing position according to one embodiment of the present invention;

DETAILED DESCRIPTION OF THE EMBODIMENTS

FIGS. 1 to 12 illustrate a reversible head restraint for a reversible automotive seat according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Further, cross-section views of automotive seat and head restraint assemblies are shown to illustrate their layers and components but such views are not necessarily to scale. Referring to the Figures, like numerals indicate like or corresponding parts throughout the several views.

Figure 1:
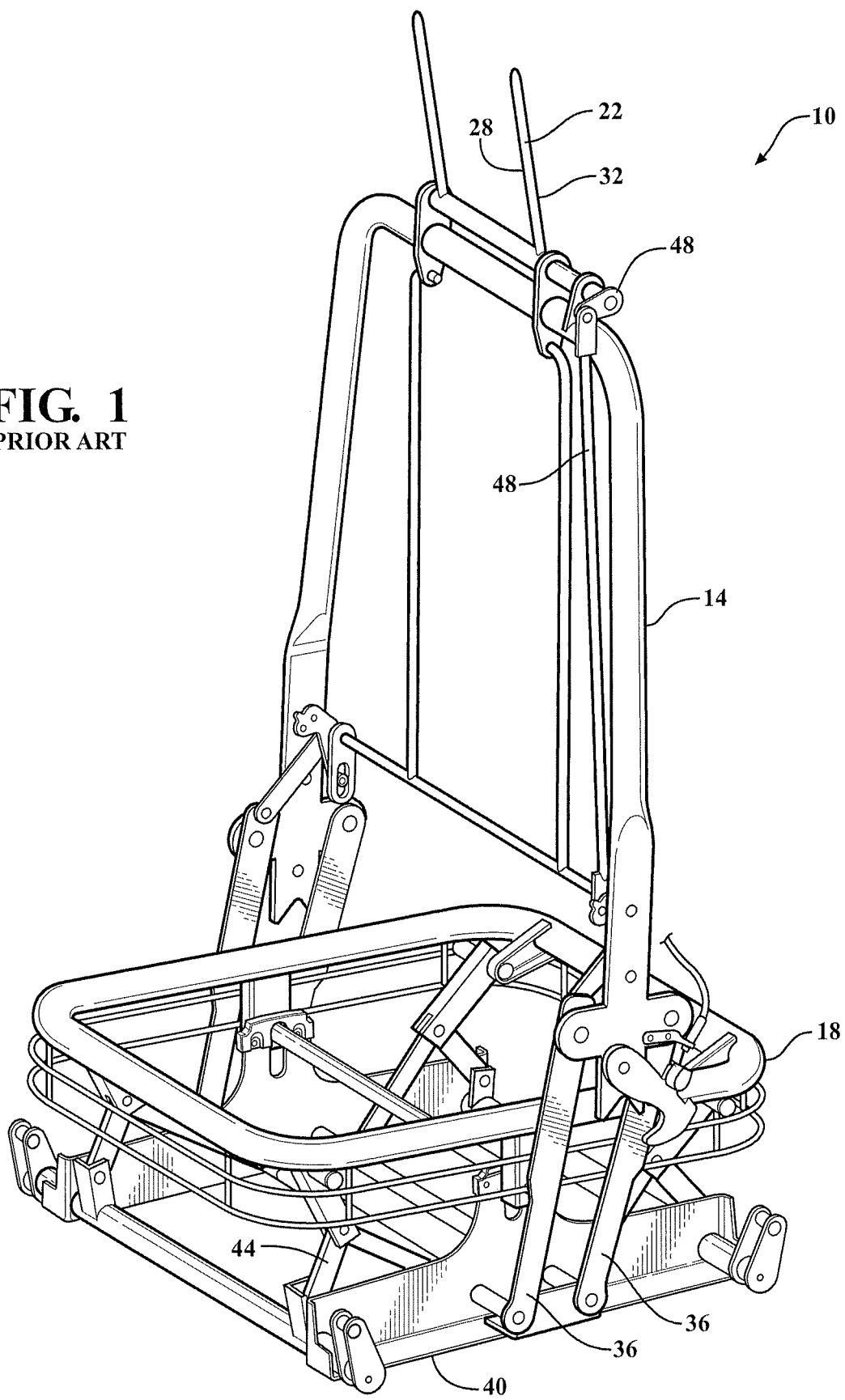
FIG. 1 illustrates a perspective view of a prior art reversible seat for an automotive vehicle in a transition position midway between a forward-facing upright position and a rearward-facing upright position.

FIG. 1 illustrates a perspective view of a prior art reversible seat 10 for an automotive vehicle (not shown) having a seat back frame 14 movable from a forward-facing upright position to a rearward-facing upright position, as is generally known in the art. FIG. 1 shows the reversible seat 10 positioned midway between the forward-facing position and the rearward-facing position. The seat 10 has a seat cushion frame 18 and a head restraint frame 22 that may automatically tilt to an appropriate inclination angle between the forward-facing position and the rearward-facing position. The head restraint frame 22 shown in FIG. 1 is generally symmetrical with a first side 28 having a profile similar to the second side 32. This permits both the first side 28 and the second side 32 of the head restraint to be used by an occupant of the seat 10 depending on if the seat 10 is in the forward-facing upright position or the rearward-facing upright position.

The reversible seat 10 comprises a seat back reversing linkage 36 operatively connected between the seat back frame 14 and a seat base 40, a seat cushion inclination linkage 44 operatively coupled between the seat back reversing linkage 36 and the seat cushion frame 18, and a head restraint inclination linkage 48 operatively coupled between the seat back reversing linkage 36 and the head restraint frame 22 to adjust the inclination angle of the head restraint frame 22. As is generally known in the art, the seat 10 comprises linkages 36, 44, 48 that control the motions of the seat back frame 14, seat cushion frame 18, and head restraint frame 22 as the seat 10 moves between the forward-facing position and the rearward-facing position. Movement of the seat back frame 14 between the opposing positions articulates the seat back reversing linkage 36 which repositions the seat cushion linkage 44 to change the inclination of the seat cushion frame 18. Movement of the seat back linkage 36 also repositions the head restraint linkage 48 which changes the inclination of the head restraint 22. An example of a known reversible seat is described in Applicant's U.S. patent application Ser. No. 12/092,718, filed Nov. 16, 2006, now U.S. Pat. No. 7,644,982, the disclosure of which is incorporated by reference herein in its entirety.

The reversible seat assembly 10 shown in FIG. 1 includes the head restraint inclination linkage 48 to provide small head restraint angle adjustment for forward- and rearward-facing seating positions. However, during the reversible seat transition, the generally upright head restraint 22 can interfere with the vehicle headliner (not shown).

During a reversing motion, the head restraint 22 for the seat 10 needs to clear the vehicle headliner (not shown). Depending on the dimensions of the seat 10 and the position of the headliner, the seat 10 and/or the head restraint 22 may contact the headliner when the seat back 14 is reversed. Reducing the height of the seat 10 and/or head restraint 22 may not be desirable because the seat 10 must meet Federal Motor Vehicle Safety Standards (FMVSS) 202A height requirements. Further, proper head restraint angles are required to also meet FMVSS 202A displacement requirements in both forward- and rearward-facing seating positions.

A novel reversible seat according to the present invention comprises a head restraint folding mechanism to fold the head restraint flat towards a top portion of the seat back while the seat is being moved between a forward-facing position and a rearward-facing position. Folding the head restraint towards the seat back increases clearance with the headliner as the seat is reversed. The head restraint folding mechanism automatically adjusts the inclination of the head restraint to an appropriate angle in both the forward-facing and rearward-facing positions to meet Federal Motor Vehicle Safety Standards (FMVSS) 202A displacement requirements. Further, this head restraint mechanism allows the seat to meet FMVSS 202A height requirements in both the forward- and rearward-facing seating positions.

FIGS. 2A-2E illustrate side views of a reversible seat 110, according to one embodiment of the present invention, as the reversible seat 110 moves between a forward-facing position (FIG. 2A), a forward-facing transition position (FIG. 2B), a head restraint fold flat position (FIG. 2C-1, FIG. 2C-2), a rearward-facing transition position (FIG. 2D), and a rearward-facing position (FIG. 2E). The reversible seat 110 comprises a head restraint 112 rotatably connected to a seat back 114 with an axis of rotation generally orthogonal to a plane of motion of the seat back 114 as the seat back 114 moves between the forward-facing position and the rearward-facing position. The head restraint 112 comprises a rearward-facing side, or rear surface, 128 and a forward-facing side, or front surface, 132. A seat back reversing four-bar linkage 136 is operatively coupled between the seat back 114 and a seat base 140 to move the seat back 114 between the forward-facing and rearward-facing positions. A head restraint inclination linkage 148 is operatively coupled between the head restraint 112 and the seat back reversing four-bar linkage 136 to rotate the head restraint 112 towards the seat back 114 and reposition the head restraint 112 in an appropriate inclination angle between a head restraint forward-facing position and a head restraint rearward-facing position as the seat back 114 is moved between opposing forward-facing and rearward-facing positions.

The phrases "fold flat position" and "folded position" represent a head restraint 112 which is rotated towards the seat back 114. The angle of inclination of the head restraint 112 in the folded position, i.e. the fold flat position, may be any angle suitable for an intended application. For example, the head restraint 112 that is folded flat may be folded (rotated) towards an upper surface of the seat back 114 at an angle of about 90 degrees with respect to a vertical line passing through the rotation axis, less than 90 degrees, or more than 90 degrees. Likewise, the head restraint 112 may be inclined at any angle suitable for an intended application when the head restraint 112 is positioned in the forward-facing and rearward-facing positions. Further, the head restraint 112 may be rotated in a forward or rearward direction (i.e., a counter-clockwise or clockwise direction) when moving between respective positions.

Figure 3A:
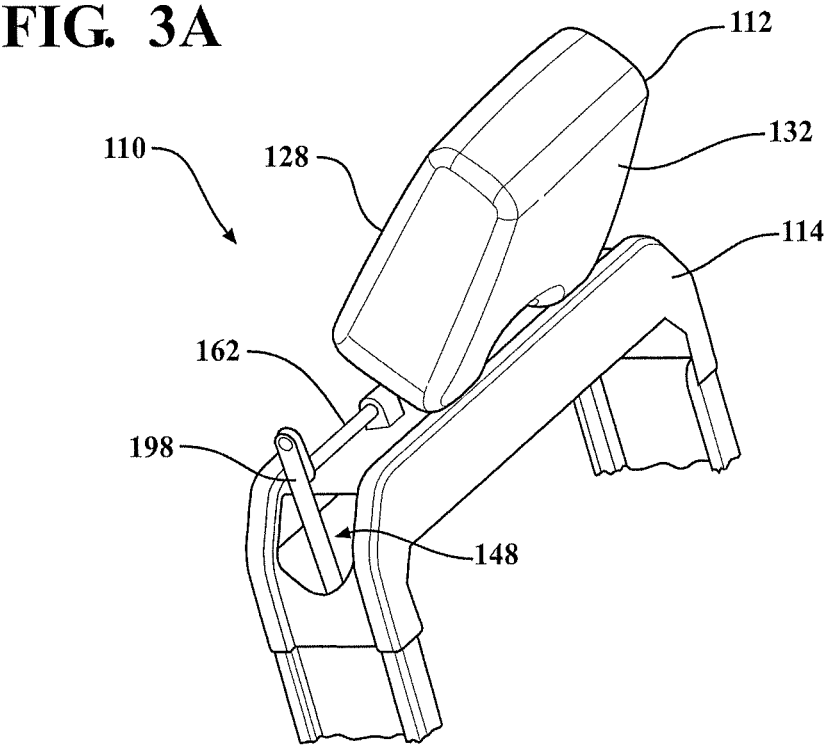
FIG. 3A illustrates a perspective side view of the head restraint of FIG. 2A in the forward-facing position according to one embodiment of the present invention.
Figure 3B:
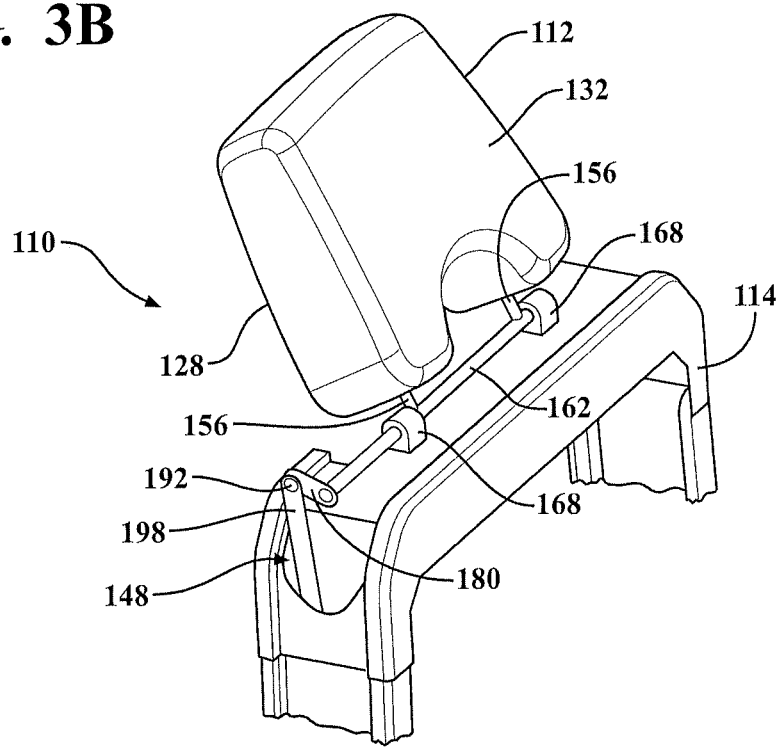
FIG. 3B illustrates a perspective side view of the head restraint of FIG. 2B in the forward-facing transition position according to one embodiment of the present invention.
Figure 3C:
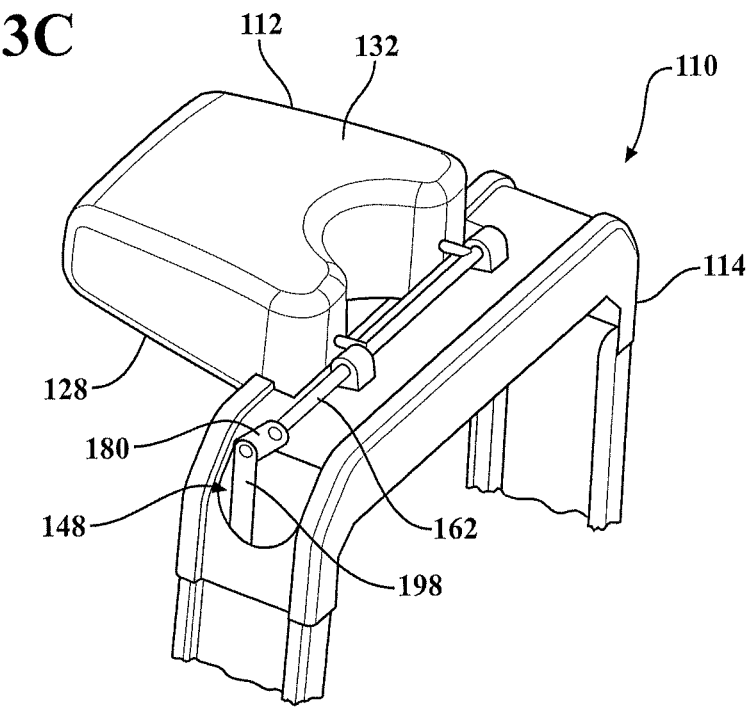
FIG. 3C illustrates a perspective side view of the head restraint of FIGS. 2C-1 and 2C-2 in the folded transition position according to one embodiment of the present invention.
Figure 3D:
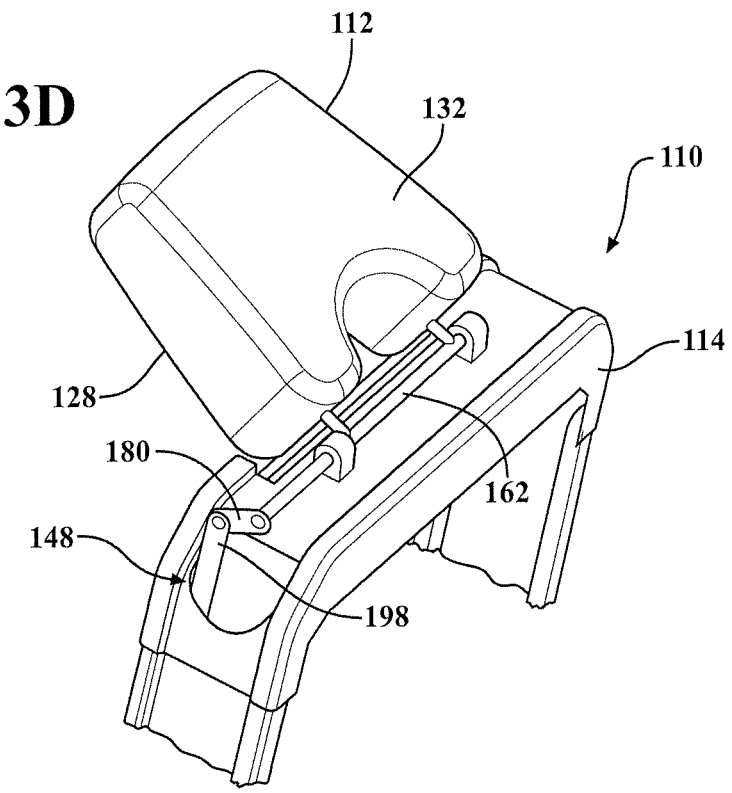
FIG. 3D illustrates a perspective side view of the head restraint of FIG. 2D in the rearward-facing transition position according to one embodiment of the present invention.
Figure 3E:
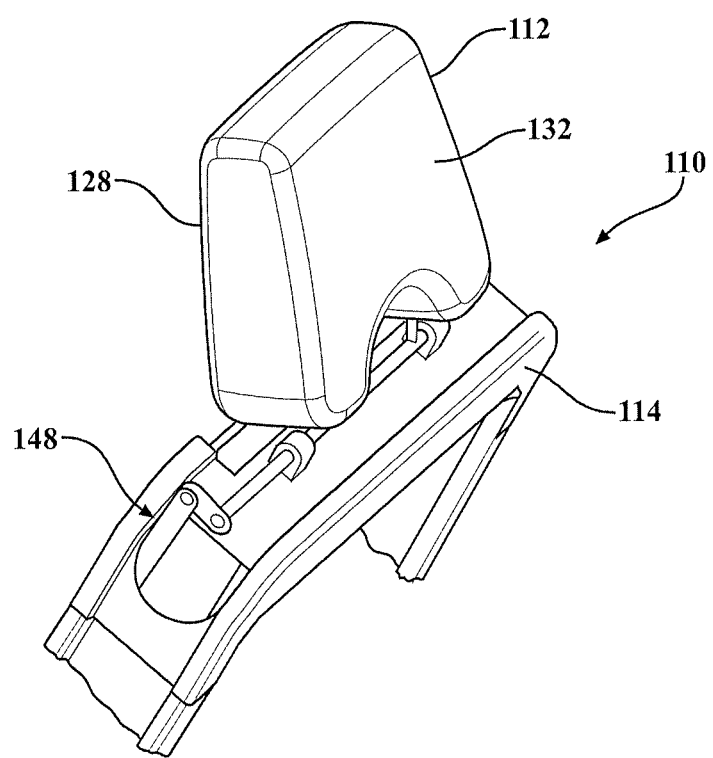
FIG. 3E illustrates a perspective side view of the head restraint of FIG. 2E in the rearward-facing position according to one embodiment of the present invention.

FIGS. 3A-3E illustrate perspective side views of the head restraint 112 and an upper portion of the seat back 114 as the seat 110 moves between the forward-facing and the rearward-facing positions, according to an embodiment of the present invention. FIG. 3A shows the head restraint 112 in the forward-facing position as shown in FIG. 2A. FIG. 3B shows the head restraint 112 in a forward-facing transition position as shown in FIG. 2B. FIG. 3C shows the head restraint 112 in the fold flat position as shown in FIGS. 2C-1 and 2C-2. FIG. 3D shows the head restraint 112 in the rearward-facing transition position as shown in FIG. 2D. FIG. 3E shows the head restraint 112 in the rearward-facing position as shown in FIG. 2E.

Referring to FIG. 3B, the head restraint 112 is fixedly coupled with one or more head restraint legs 156 which are further fixedly coupled to a head restraint rotating rod 162. The head restraint rotating rod 162 is rotatably coupled with the seat back 114 by one or more rod support brackets 168. The head restraint rotating rod 162 generally extends laterally in a direction orthogonal to a plane of motion of the seat back 114 as the seat back moves between a forward-facing position and a rearward-facing position. However, other orientations of the rotating rod 162 suitable for an intended application may be used.

A first end 174 (FIG. 6) of a head restraint short link 180 is fixedly coupled with one distal end of the head restraint rotating rod 162. A second end 186 of the head restraint short link 180 is rotatably coupled to a head restraint long link 198 at a head restraint upper pivot 192. The head restraint long link 198 and the head restraint short link 180 are portions of the head restraint inclination linkage 148. As illustrated in FIGS. 3A-3E, motion of the head restraint long link 198 repositions the head restraint short link 180 which rotates the head restraint rotating rod 162 to fold the head restraint 112 towards the seat back frame 114 and then rotate the head restraint 112 to an appropriate inclination angle for the respective forward-facing and rearward-facing positions (FIGS. 3A, 3E).

Figure 4:
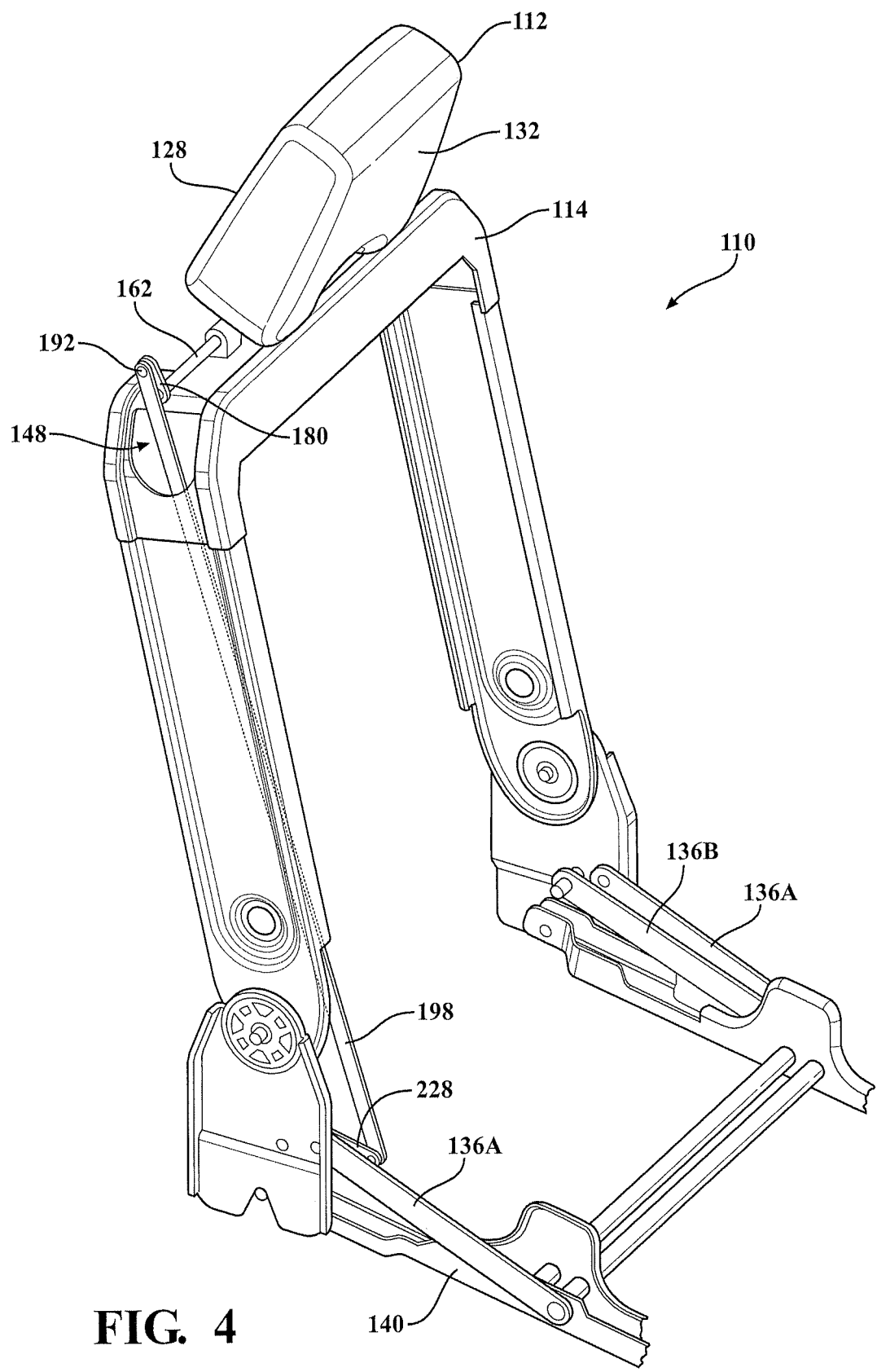
FIG. 4 illustrates a perspective side view of the reversible seat of FIG. 2A in the forward-facing position according to one embodiment of the present invention.
Figure 5:
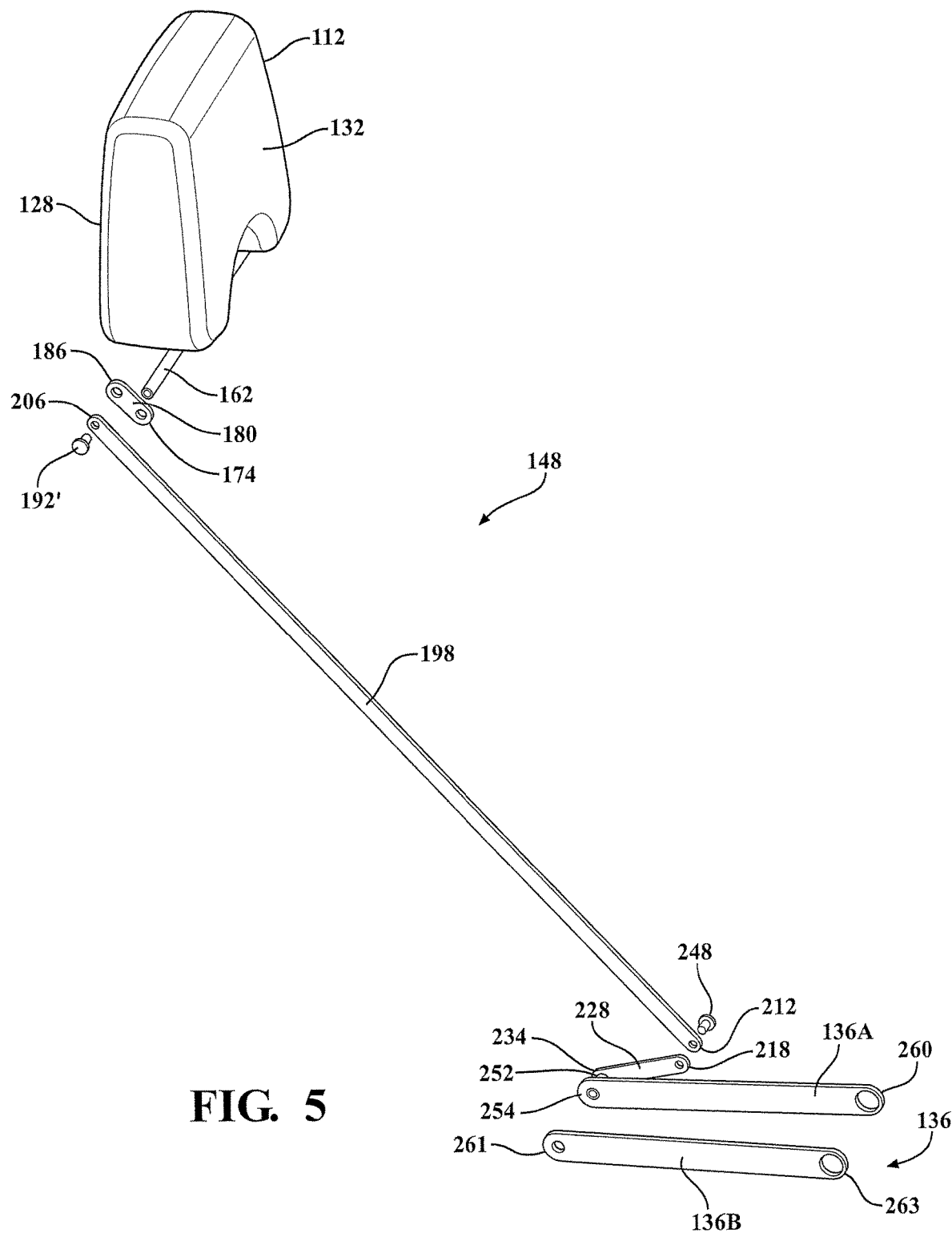
FIG. 5 illustrates an exploded view of the head restraint and linkages of the reversible seat of FIG. 4 according to one embodiment of the present invention.
Figure 6:
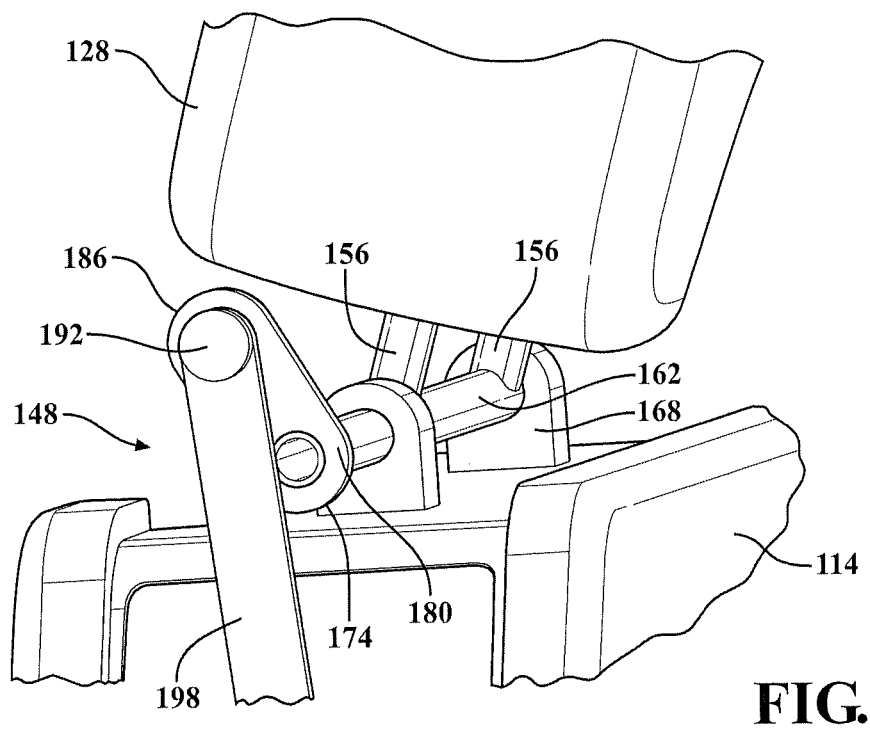
FIG. 6 illustrates a fragmentary perspective view of links coupled with the head restraint of the reversible seat shown in FIG. 4 according to one embodiment of the present invention.
Figure 7:
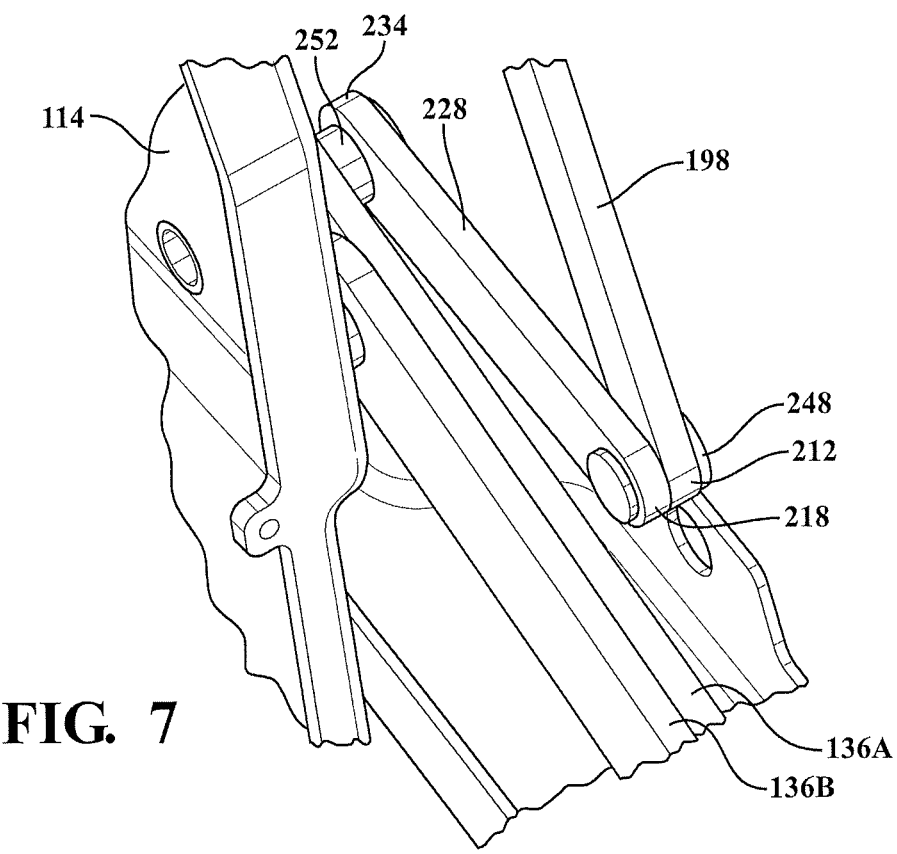
FIG. 7 illustrates a fragmentary perspective view of links coupled with seat back reversing linkage of the reversible seat shown in FIG. 4 according to one embodiment of the present invention.

FIG. 4 illustrates a perspective side view of the head restraint inclination linkage 148 operatively coupled between the head restraint 112 and the seat back reversing four-bar linkage 136 when the seat is in the forward-facing position (FIGS. 2A, 3A). An exploded side view of the head restraint 112, the head restraint inclination linkage 148, and the seat back reversing four-bar linkage 136 in the forward-facing position is shown in FIG. 5. The connection between the head restraint inclination linkage 148 and the head restraint 112 is shown in the fragmentary perspective view of FIG. 6. The connection between the head restraint inclination linkage 148 and the seat back reversing four-bar linkage 136 is shown in the fragmentary perspective view of FIG. 7. The head restraint inclination linkage 148 comprises the head restraint short link 180 fixedly coupled at the first end 174 to the head restraint rotating rod 162 and rotatably coupled with a pivot pin 192' at the upper pivot 192 adjacent the second end 186. The head restraint inclination linkage 148 further comprises the head restraint long link 198 rotatably coupled at the upper pivot 192 with the pivot pin 192' at a first end 206 and rotatably coupled with a lower pivot pin 248 at a second end 212 with one end 218 of a head restraint four-bar link 228. A second end 234 of the head restraint four-bar link 228 is rotatably coupled with a pin 252 and one end 254 of a first seat back reversing four-bar linkage 136A. The second end 260 of the seat back reversing four-bar linkage 136A is rotatably coupled with the seat base 140. A second seat back reversing four-bar linkage 136B, positioned generally parallel to the first seat back reversing four-bar linkage 136A, is rotatably coupled at a first end 261 to the lower portion of the seat back 114 and rotatably coupled at an opposite second end 263 to the seat base 140. The first and second seat back reversing four-bar linkages 136A, 136B support and guide the seat back 114 between the opposing forward-facing and rearward-facing positions.

Figure 8:
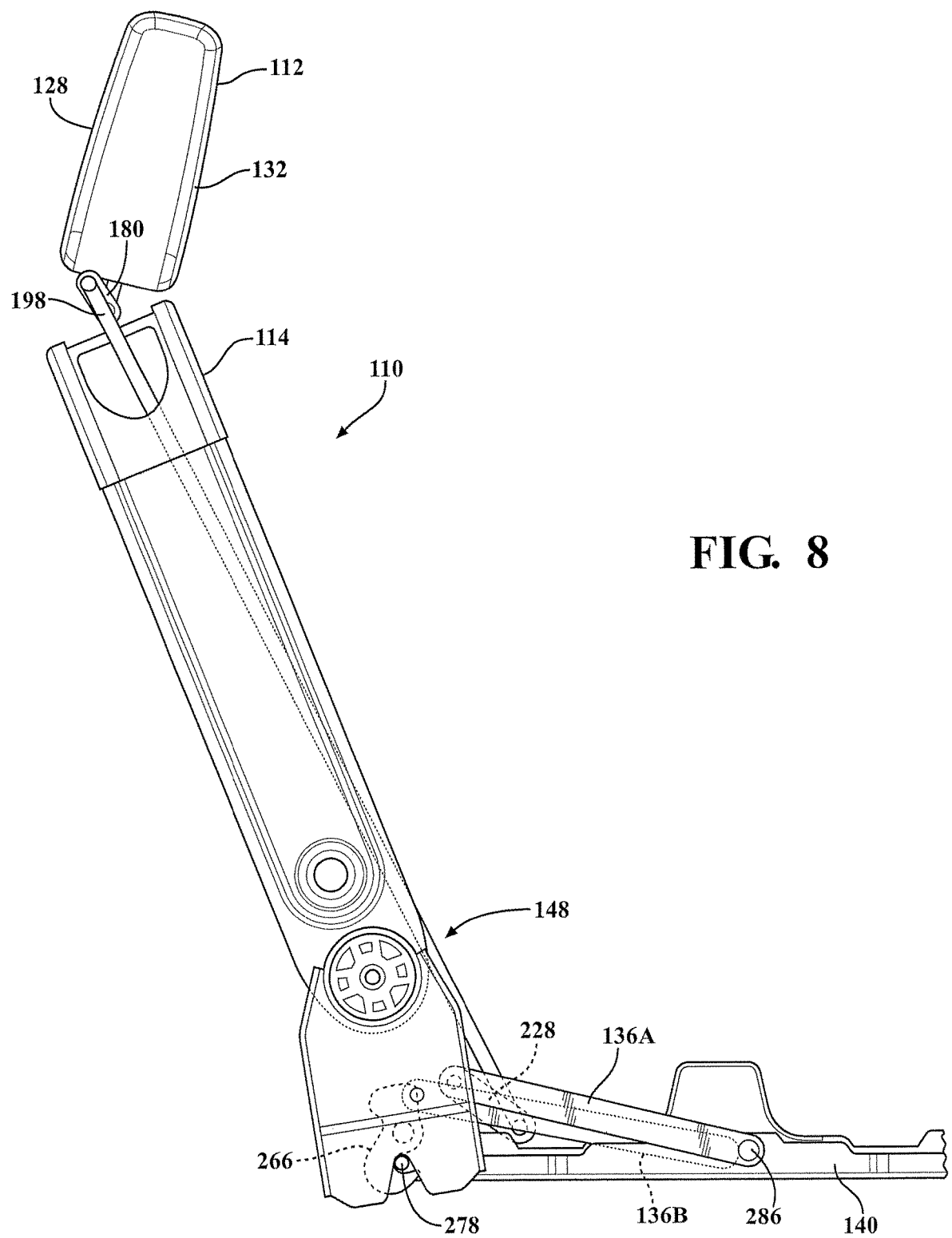
FIG. 8 illustrates a side view of the reversible seat in the forward-facing position as shown in FIG. 2A according to one embodiment of the present invention.
Figure 10:
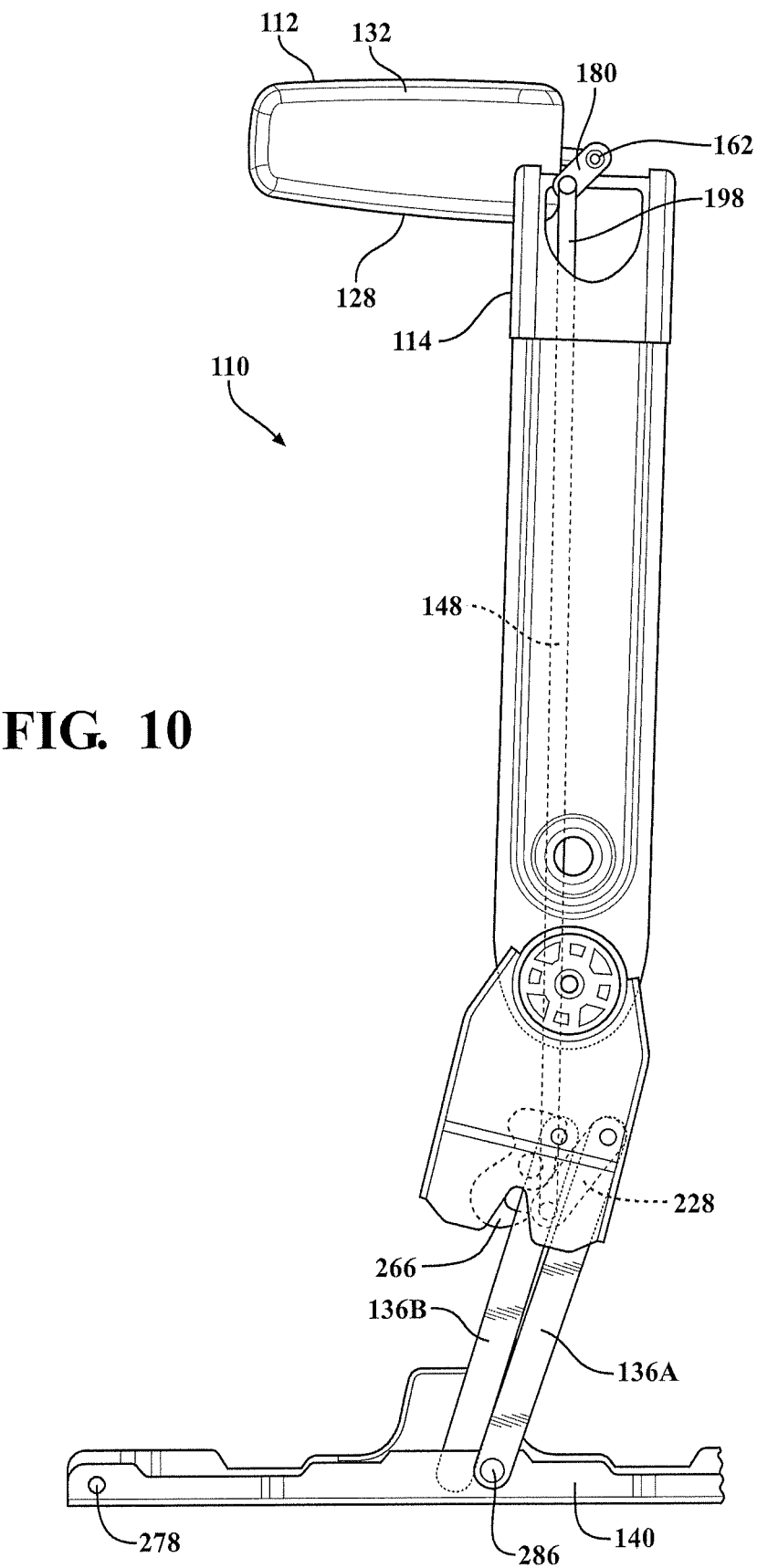
FIG. 10 illustrates a side view of the reversible seat shown in FIGS. 2C-1 and 2C-2 in the folded transition position according to one embodiment of the present invention.
Figure 11:
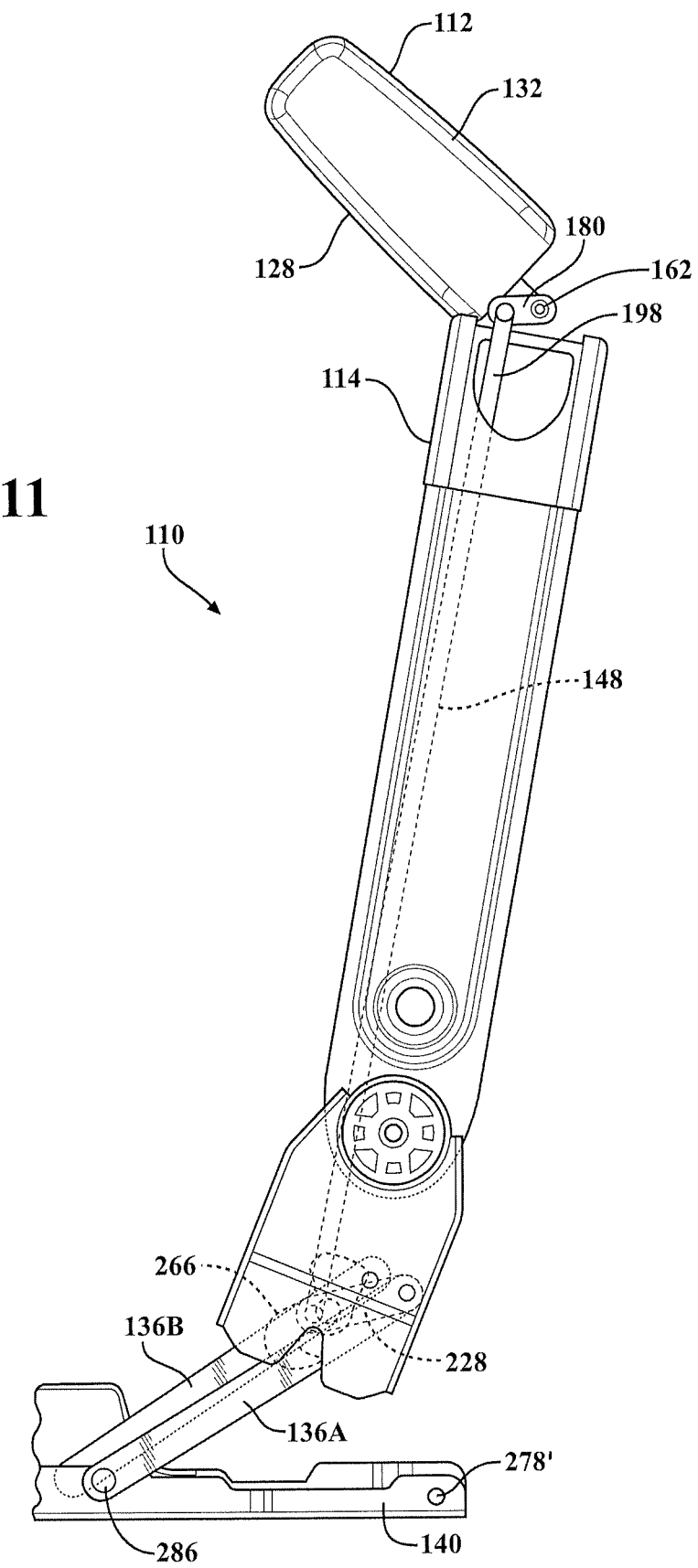
FIG. 11 illustrates a side view of the reversible seat shown in FIG. 2D in the rearward-facing transition according to one embodiment of the present invention.
Figure 12:
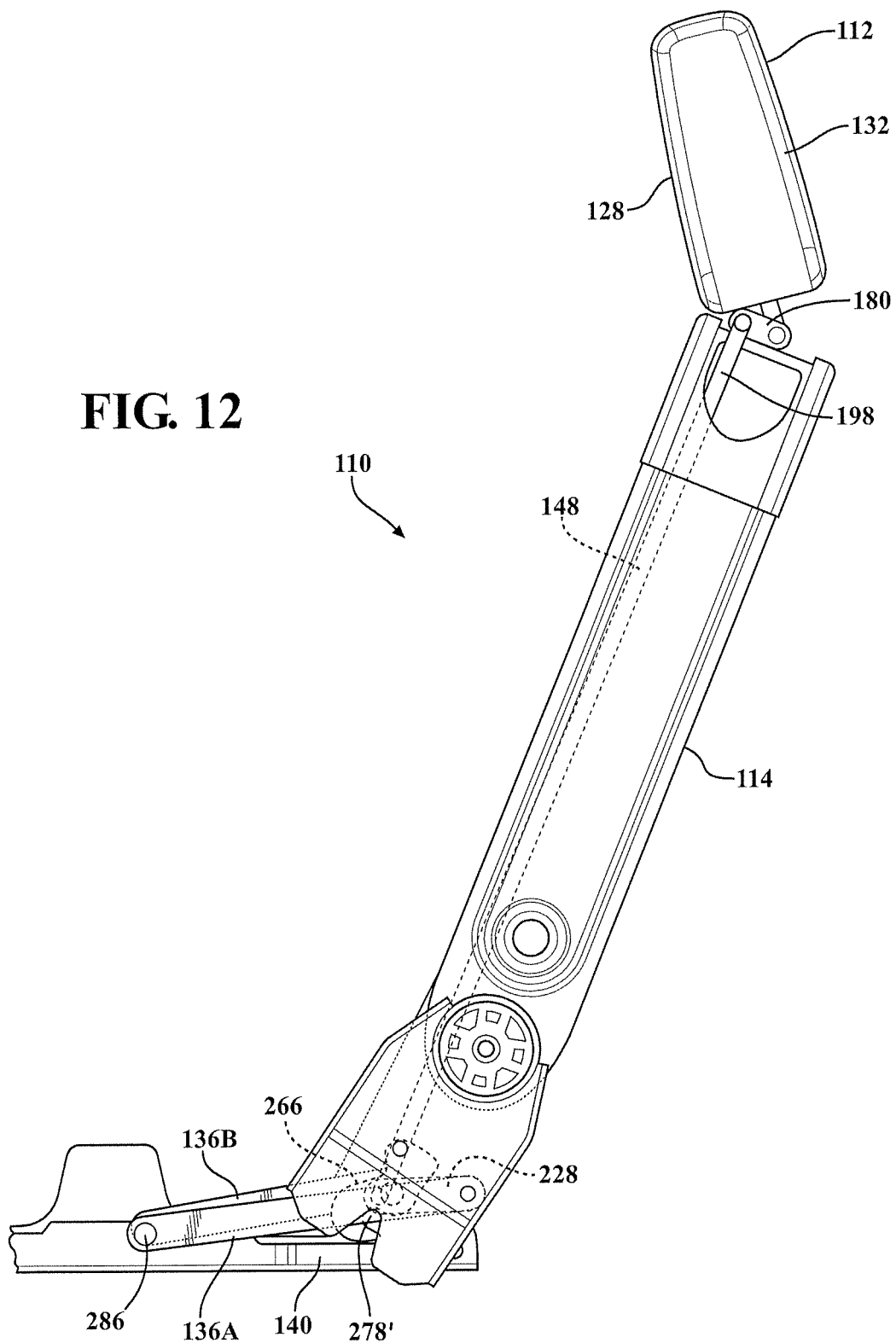
FIG. 12 illustrates a side view of the reversible seat shown in FIG. 2E in the rearward-facing position according to one embodiment of the present invention.

FIGS. 8 through 12 illustrate side views of the positions of the head restraint 112, the head restraint inclination linkage 148, and the seat back reversing four-bar linkage 136 as the reversible seat 110 moves between the forward-facing and the rearward-facing positions. As described, the head restraint 112 is repositioned from the forward-facing position (FIG. 8), through the forward-facing transition position (FIG. 9), to the fold down position (FIG. 10), through the rearward-facing transition position (FIG. 11), and ending at the rearward-facing position (FIG. 12). The motions of the head restraint 112 are controlled by the head restraint inclination linkage 148, which in turn is driven by the seat back reversing four-bar linkage 136. The reversible seat 110 may also move between the rearward-facing position (FIG. 12) to the forward-facing position (FIG. 8). A latch 266 releasably engaged with a latch pin 278, 278' locks the seat back reversing four-bar linkage 136, and thus the seat back 114, in the forward-facing and the rearward-facing positions, respectively (FIGS. 8, 12).

The motion of the head restraint 112 is described by the following steps, which will be discussed in more detail with respect to FIGS. 8 through 12 below.

Step 1: The head restraint 112 is fixed in its forward-facing position via the latch 266 that locks the seat back reversing four-bar linkage 136, and thus the seat back 114 in the forward-facing position. See FIG. 8.

Step 2: Release the latch 266 to start reversing the seat 110. The head restraint 112 will be pulled to the folded-flat orientation through the head restraint linkage 148 driven by the seat back reversing four-bar linkage 136. See FIG. 9 (forward-facing transition position) and FIG. 10 (fold flat position).

Step 3: The head restraint 112 will be unfolded when the seat back reversing four-bar linkage 136 is approaching its reversible position. The head restraint 112 will be fixed in its rearward-facing position when the latch 266 locks the seat back reversing four-bar linkage 136, and thus the seat back 114 in the rearward-facing position. See FIG. 11 (rearward-facing transition position) and FIG. 12 (rearward-facing position).

FIG. 8 illustrates the side view of the head restraint 112 and seat back 114 in the forward-facing position with the latch 266 engaged with the latch pin 278 which retains the seat back 114 in the forward-facing position.

Figure 9:
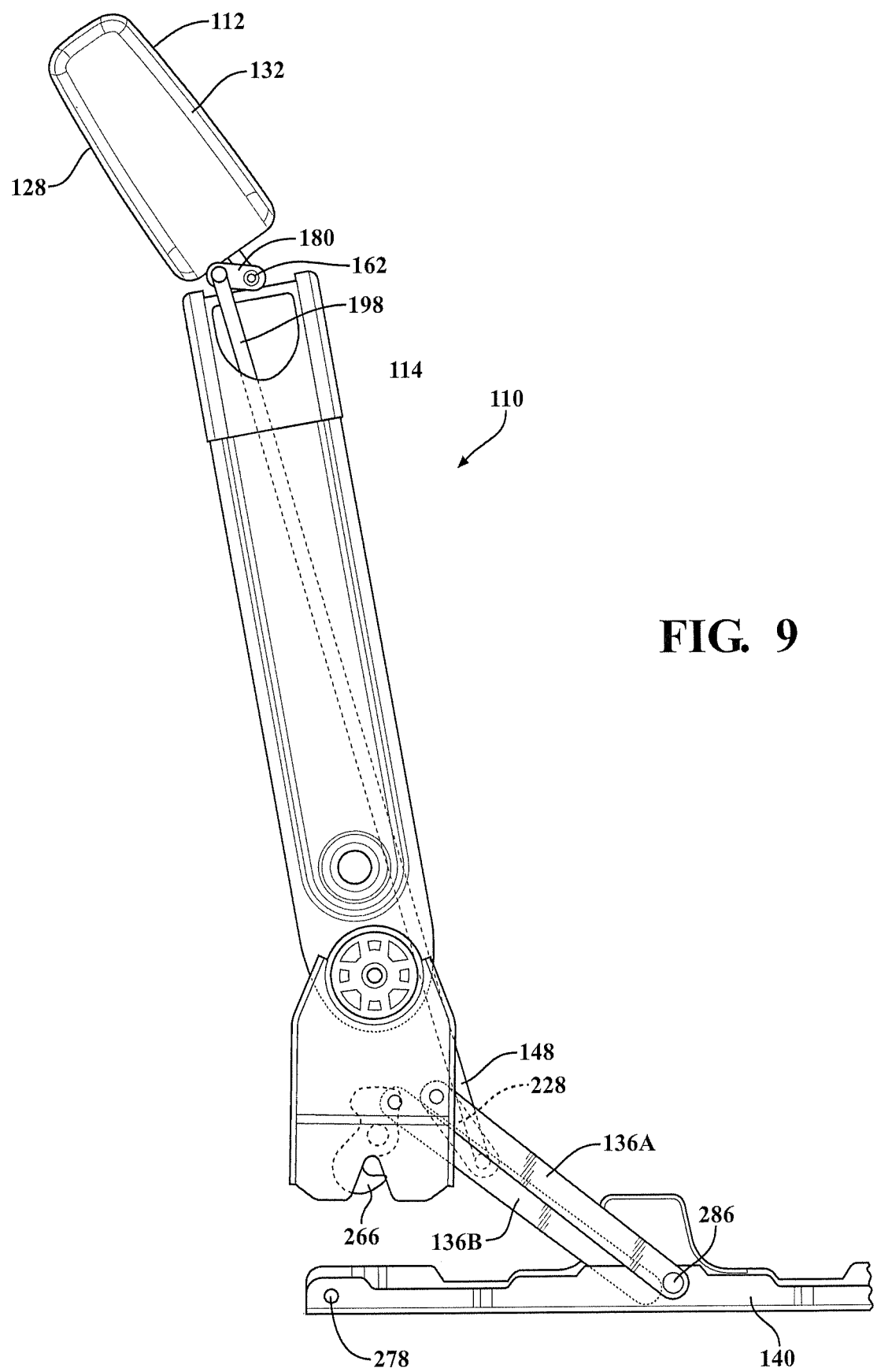
FIG. 9 illustrates a side view of the reversible seat shown in FIG. 2B in the forward-facing transition position according to one embodiment of the present invention.

When the latch 266 is released from the latch pin 278, the seat back 114 may move towards the forward-facing transition position as shown in FIG. 9. As the seat back reversing four-bar linkage 136 rotates about a lower pivot 286, the head restraint four-bar link 228 begins to rotate, which moves the head restraint long link 198, the coupled head restraint short link 180, and then begins to rotate the head restraint rotating rod 162.

FIG. 10 illustrates the side view of the seat back 114 and head restraint 112 when the seat back 114 is positioned in generally at the midpoint between the forward-facing and rearward-facing positions. As the seat back reversing four-bar linkage 136A approaches the midpoint (shown in FIG. 10), the head restraint four-bar link 228 rotates and repositions the head restraint long link 198, the coupled head restraint short link 180, and the head restraint rotating rod 162 such that the head restraint 112 is rotated to the fold flat position. The head restraint 112 may be rotated to an angle generally parallel to the seat base 140 or rotated to any angle suitable for an intended application. Clearance to the vehicle headliner is increased by rotating the head restraint 112 as the seat back 114 moves generally past the midpoint between the opposing positions.

FIG. 11 illustrates the side view of the seat back 114 and head restraint 112 in the rearward-facing transition position when the seat back 114 moves between the head restraint fold flat (or midway) position towards the rearward-facing position. As the seat back reversing four-bar linkage 136A rotates about a lower pivot 286 towards the rearward-facing position, the head restraint four-bar link 228 rotates, which moves the head restraint long link 198, the coupled head restraint short link 180, and begins to rotate the head restraint rotating rod 162 towards an inclination angle suitable for the rearward-facing position, i.e. the head restraint 112 starts to rotate away from the seat back 114 and towards an upright position.

FIG. 12 illustrates the side view of the seat back 114 and the head restraint 112 in the rearward-facing design position. When the seat back reversing four-bar linkage 136A rotates towards the rearward-facing position, the head restraint four-bar link 228 rotates, which rotates the head restraint long link 198, the coupled head restraint short link 180, and the head restraint rotating rod 162 to position the head restraint 112 at an appropriate inclination angle for the rearward-facing position. As shown in FIG. 12, the latch 266 engages with a latch pin 278' which locks the seat back reversing four-bar linkage 136, and thus the seat back 114 in the rearward-facing position.

One benefit of the head restraint mechanism for a reversible seat which folds flat during the seat back reversal is a head restraint which meets FMVSS 202A height requirements in both the forward-facing and rearward-facing positions. A second benefit is a head restraint inclination linkage which may be packaged within a vehicle seat. An additional benefit is a head restraint which adjusts its position and direction driven by the seat back reversing linkage of a reversible seat. Also, the disclosed head restraint mechanism increases clearance with the headliner as the seat is reversed between opposing positions.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A reversible seat for an automotive vehicle, said reversible seat comprising:
   a head restraint rotatably coupled with a seat back;
   said seat back being movable between a seat back forward-facing position, a seat back transition position, and a seat back rearward-facing position;
   said head restraint rotatable about a rotational axis generally orthogonal to a plane of motion of said seat back as the seat back moves between said seat back positions;
   said head restraint rotatable about said rotational axis between a head restraint forward-facing position, a head restraint folded position, and a head restraint rearward-facing position;
   wherein movement of said seat back between one of said seat back forward-facing and rearward-facing positions towards said seat back transition position automatically rotates said head restraint about said rotational axis towards said head restraint folded position; and
   wherein movement of said seat back from said seat back transition position towards one of said seat back forward-facing and rearward-facing positions automatically rotates said head restraint from said head restraint folded position towards the respective one of said head restraint forward-facing and rearward-facing positions.

2. The reversible seat as set forth in claim 1, wherein:
   said head restraint comprises a front surface and a rear surface;
   said front surface faces an occupant of said seat when said seat back is in said seat back forward-facing position; and
   said rear surface faces an occupant of said seat when said seat back is in said seat back rearward-facing position.

3. The reversible seat as set forth in claim 2, wherein:
   said reversible seat comprises a seat base and a reversible four-bar linkage; and
   said four-bar linkage operatively coupled between said seat base and said seat back;
   wherein movement of said four-bar linkage repositions said seat back between said seat back forward-facing, transition, and rearward-facing positions.

4. The reversible seat as set forth in claim 3, wherein said head restraint is operatively coupled with said four-bar linkage such that actuation of said four-bar linkage automatically moves said head restraint between said head restraint positions.

5. The reversible seat as set forth in claim 4, wherein said head restraint fixedly coupled with a head restraint rotating rod; and
   said rotating rod operatively coupled with said four-bar linkage such that actuation of said four-bar linkage automatically rotates said rotating rod.

6. The reversible seat as set forth in claim 5, wherein:
   said head restraint is in said head restraint forward-facing position when said seat back is in said seat back forward-facing position;
   said head restraint is in said head restraint rearward-facing position when said seat back is in said seat back rearward-facing position; and
   said head restraint is in said head restraint folded position when said seat back is about midway between said seat back forward-facing and rearward-facing positions.

7. The reversible seat as set forth in claim 6, wherein said seat comprises a head restraint inclination linkage operatively coupled between said rotating rod and said four-bar linkage.

8. The reversible seat as set forth in claim 7, wherein said head restraint inclination linkage comprises:
   a four bar link having a first end rotatably coupled with said four-bar linkage and having a second end rotatably coupled with a lower pivot;

a long link having a first end rotatably coupled with said lower pivot and having a second end rotatably coupled with an upper pivot; and a short link having a first end rotatably coupled with said upper pivot and having a second end fixedly coupled with said rotating rod.

9. The reversible seat as set forth in claim 8, wherein:

movement of said four bar link automatically repositions said four bar link;

movement of said four bar link automatically repositions said long link;

movement of said long link automatically repositions said short link; and movement of said short link automatically rotates said rotating rod;

such that said head restraint fixedly coupled with said rotating rod is repositioned in response to movement of said four-bar linkage, four bar link, long link, and short link.

10. A head restraint inclination linkage for a reversible automotive seat having a head restraint, said inclination linkage comprising:

a four bar link having a first end rotatably coupled with a seat reversing four-bar linkage and having a second end rotatably coupled with a lower pivot;

a long link having a first end rotatably coupled with said lower pivot and having a second end rotatably coupled with an upper pivot;

a short link having a first end rotatably coupled with said upper pivot and having a second end fixedly coupled with a rotating rod; and said head restraint fixedly coupled with said rotating rod;

wherein movement of said seat reversing four-bar linkage repositions said head restraint inclination linkage to change an inclination of said head restraint.

11. The head restraint inclination linkage as set forth in claim 10, said seat reversing four-bar linkage configured to move said reversible automotive seat between a forward-facing position, a transition position, and a rearward-facing position;

wherein said transition position is generally midway between said forward-facing and rearward-facing positions.

12. The head restraint inclination linkage as set forth in claim 11, said head restraint having a forward-facing upright position, a rearward-facing upright position, and a folded position.

13. The head restraint inclination linkage as set forth in claim 12, wherein:

wherein movement of said reversible automotive seat from one of said forward-facing and rearward-facing positions to said transition position rotates said head restraint in a first direction about a rotational axis generally orthogonal to a plane of motion of said reversible automotive seat to said folded position;

wherein movement of said reversible automotive seat from said transition position to one of said forward-facing and rearward-facing positions rotates said head restraint in a second direction about said rotational axis towards a respective one of said forward-facing upright and rearward-facing upright positions; and said first direction of rotation is different than said second direction of rotation.

14. The head restraint inclination linkage as set forth in claim 13, wherein:

said head restraint comprises a front surface and a rear surface;

said front surface faces an occupant of said reversible automotive seat when said reversible automotive seat is in said forward-facing position; and said rear surface faces an occupant of said reversible automotive seat when said reversible automotive seat is in said rearward-facing position.

15. The head restraint inclination linkage as set forth in claim 14, said reversible automotive seat comprising a seat back, a seat cushion, and a seat frame; and said seat reversing four-bar linkage operatively coupled between said seat back and said seat frame;

wherein said seat reversing four-bar linkage repositions said seat back between a seat back forward-facing position and a seat back rearward-facing position.

16. The head restraint inclination linkage as set forth in claim 15, wherein:

said head restraint is positioned at a first inclination angle about said rotational axis when said inclination linkage is positioned in said forward-facing position;

said head restraint is positioned in a second inclination angle about said rotational axis when said inclination linkage is positioned in said rearward-facing position; and said first inclination angle being different than said second inclination angle.

17. The head restraint inclination linkage as set forth in claim 16, wherein said head restraint is rotatably coupled with said seat back.

18. A method of reversing an automotive seat between one of a forward-facing position and a rearward-facing position, said method comprising:

providing a reversible seat having a foldable head restraint wherein folding of said head restraint is automatically actuated by moving said reversible seat between said forward-facing and rearward-facing positions;

articulating seat reversing links to move said seat which drives rotation of said head restraint about a head restraint rotational axis, said head restraint rotational axis being generally orthogonal to a plane of motion of said seat as said seat moves between said forward-facing and rearward-facing positions;

rotating said head restraint to a folded rotational position with respect to said head restraint rotational axis as said articulating seat reversing links approach a midpoint between said forward-facing and rearward-facing positions;

rotating said head restraint to an inclined upright rotational position with respect to said head restraint rotational axis as said articulating seat reversing links approach one of said forward-facing and rearward-facing positions; and locking said head restraint in said inclined upright rotational position by locking said articulating seat reversing links in one of said forward-facing and rearward-facing positions.

19. The method as set forth in claim 18, said method comprising:

rotating said head restraint in a first direction about a rotational axis generally orthogonal to a plane of motion of said seat as said seat moves from one of said forward-facing and rearward-facing positions to a transition position midway between said forward-facing and rearward-facing positions; and rotating said head restraint in a second direction different about said rotational axis as said seat moves from said transition position to one of said forward-facing and rearward-facing positions, said second direction being different than said first direction.

20. The method as set forth in claim 19, said method comprising:
  rotating said head restraint to a first inclination angle about said rotational axis when said seat is moved to said rearward-facing position; and
  rotating said head restraint to a second inclination different than said first inclination angle about said rotational axis when said seat is moved to said forward-facing position.

\* \* \* \* \*